United States Patent [19]

Burton

[11] 3,831,635

[45] Aug. 27, 1974

[54] PERSONNEL PROTECTION SLEEVE
[75] Inventor: Frank L. Burton, Littleton, Colo.
[73] Assignee: The Gates Rubber Company, Denver, Colo.
[22] Filed: June 30, 1972
[21] Appl. No.: 267,814

[52] U.S. Cl. ............................. 138/114, 285/149
[51] Int. Cl. ............................................ F16l 11/00
[58] Field of Search................. 138/114, 172, 109; 285/149, 242, 259

[56] References Cited
UNITED STATES PATENTS
2,686,962  8/1954  Swann.......................... 285/149 X
2,797,111  6/1957  Beazley................................ 285/259
2,864,378  12/1958  Schneller et al................ 138/109 X Primary Examiner—William I. Price
Assistant Examiner—Steven M. Pollard
Attorney, Agent, or Firm—H. W. Oberg, Jr.; Raymond Fink; Curtis H. Castleman, Jr.

[57] ABSTRACT

A sleeve of predetermined length that fits over one end portion of a high pressure flexible hose assembly. One end of the sleeve is coupled to or near a coupling of the hose assembly while the opposite end of the sleeve is unfastened.

3 Claims, 2 Drawing Figures

PERSONNEL PROTECTION SLEEVE

BACKGROUND OF THE INVENTION

The invention relates to safety devices for handling matter through flexible pipes or conduits under high pressures, but more particularly, the invention relates to personnel protectors attached to hose assemblies that are adapted to transfer constituents at high pressures.

Flexible hoses are commonly used to transfer a fluid in the liquid or gaseous state at pressures exceeding 250 pounds per square inch. Oftentimes, an operator must handle and direct the free or nozzle end of a hose assembly while effluents are emitted at extremely high velocities as induced by high fluid pressures. For example, it is common for an operator to handle the nozzle discharge end of a water discharge hose operating at 2000 pounds per square inch while cleaning barges or mucking a mine. While hoses presently used in such applications are quite good, they may present possible safety hazard to an operator should they burst. It is standard practice in the industry to specify in the interest of safety that hose for such applications have a minimum burst pressure or safety factor that is five times the rated working pressure of the hose. In the above example, the hose would typically have a minimum burst pressure of 10,000 pounds per square inch for a working pressure rating of 2,000 pounds per square inch.

While the intent of protecting an operator from hazardous exposure through specification of a high safety factor hose is quite good, hoses may still fail and inflict harm to an operator. The expected service life for such hose varies with the type of use and type of hose treatment or handling. For economical reasons, it would be ideal to replace the hose just prior to the time that it would burst; however, this cannot be practically done.

Moreover, a prevalent area for hose failure is near the hose coupling. The coupling is where reinforcements of the hose are stressed to a maximum. Also, the end portion of the hose is where maximum flexing and abuse is inflicted to a hose by an operator.

SUMMARY OF THE INVENTION

A sleeve is provided in combination with a hose assembly. The sleeve fits over and is attached at one end to the discharge end portion of the hose.

Accordingly, the object of the invention is to provide a safety device to protect personnel from injury due to inadvertent hose failure while working with the discharge end of a high pressure hose assembly.

The object and advantages of the invention will become more apparent after reviewing the drawings and description thereof wherein.

DESCRIPTION OF PREFERRED EMBODIMENTS

Figure 1:
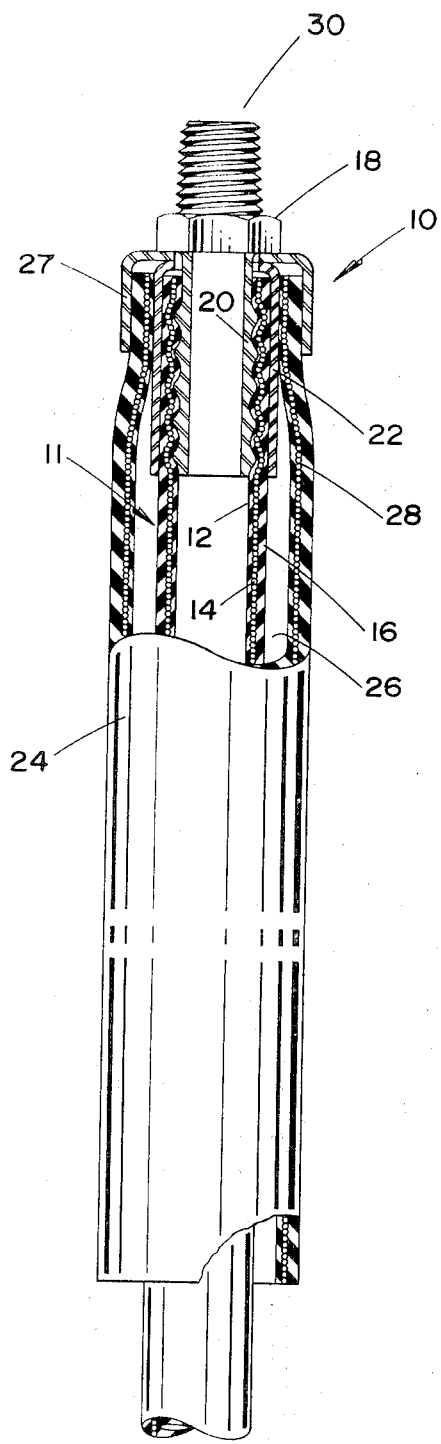
FIG. 1 is an axial cross section showing a hose assembly including the sleeve of the invention.

In accordance with the invention, and as proffered in the drawings, a hose assembly 10 is provided that includes the personnel protection sleeve of the invention. The hose portion 11 of the assembly includes a flexible polymeric tube 12 around which is placed at least one ply of woven or twined reinforcement. The reinforcement may be twined such as by spiralling, braiding, or knitting. A flexible polymeric cover 16 is formed over the reinforcement. The polymeric tube 12 and cover 16 may be of any suitable hose material such as natural or synthetic rubber, polyurethane, polyvinyl chloride, nylon, or the like. Similarly, the reinforcement 14 may be of any suitable material such as a textile or wire.

A coupling 18 is affixed to one end portion of the hose in known fashion. The coupling includes a stem 20 and ferrule 22 which sandwich and grip the hose. Nozzle means, not shown, may be attached to or included as a part of the coupling 18. The coupled end defines the discharge end portion of the hose.

Figure 2:
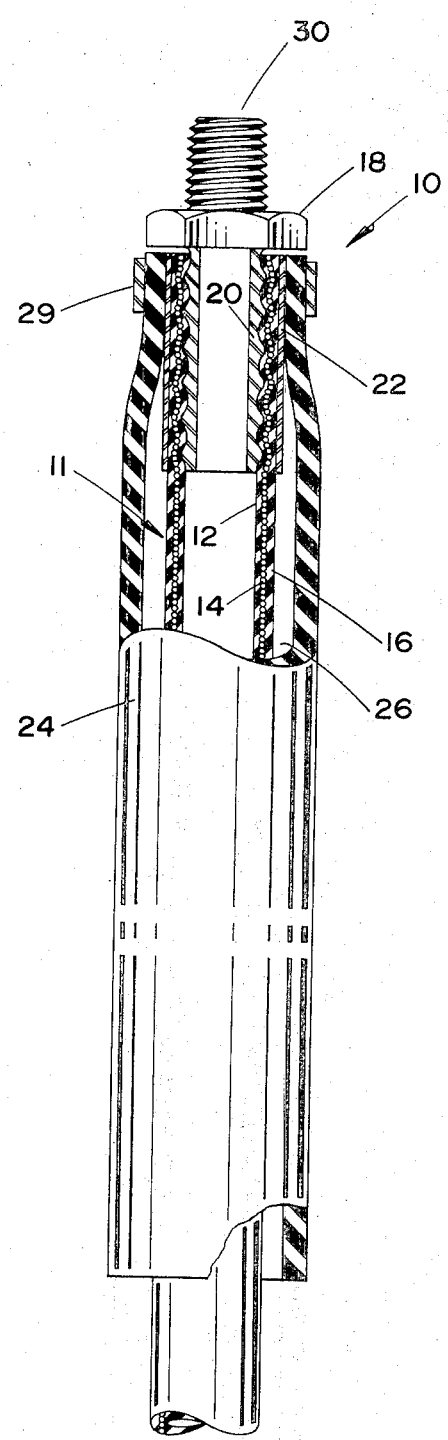
FIG. 2 is a view similar to FIG. 1 showing an alternate form of the invention.

A flexible polymeric sleeve 24 is fitted over the hose 11 near the discharge end. The internal diameter of the sleeve 24 is greater than the external diameter of the hose 11. The fit between the hose and sleeve may be snug, but preferably, the sleeve internal diameter is sufficiently larger than the external diameter of the hose to define an annular escape volume 26. One end of the sleeve 24 is attached directly over the coupling 18 while the other end is unfastened. The sleeve 24 may be attached using any desirable technique such as with large diameter ferrules 27, FIG. 1, or with bands 29, FIG. 2.

The flexible sleeve 24 is fabricated using any desirable technique and materials. A reinforcement 28 may be included, FIG. 1, or excluded for some applications, FIG. 2. However, the sleeve 24 is preferably a short piece of hose that is large enough to fit over the hose 11. The protection sleeve 24 is of sufficient length to shield the body of an operator when the assembly is in use. A length between 2 and 7 feet is normally adequate. The shorter lengths are preferable when an operator uses the assembly 10 while standing whereas the longer lengths are desirable for using the assembly while the operator is in a prone position.

When the assembly 10 of the invention is in use, an operator handles and directs the free or discharge 30 end of the assembly as desired. The hose 11 may be pressurized to any typical high operating pressure that is commensurate with the intended use. Pressures above 250 pounds per square inch are usually considered to be high pressures. In some applications such as in water wash down hose, the operating pressures may be as high as 2,000 to 3,000 pounds per square inch. The particular range of hose operating pressures are relatively unimportant and included as background information as to operating pressures which may be hazardous to personnel that are required to be near or in close contact with the hose. Whatever the intended operating pressure, the protection sleeve of the invention may be used in the interest of personnel safety.

As previously discussed, when one free end of a hose is commonly handled by an operator, the typical or prevalent point of hose failure is near the coupling 18. Should the hose 11 burst, of the assembly 10 of the invention, any effluents emitted through the break will be contained by the protection sleeve 24 and directed through the annular volume 26 away from the coupling and an operator. The protection sleeve protects the operator from effluents emitted through a rupture, or parts of the hose assembly which may be torn off as a result of the rupture, while also substantially precluding the free end of the hose from being whipped around due to a sudden release of pressure.

The foregoing detailed description is made for purpose of illustration only and is not intended to limit the scope of the invention which is to be determined from the appended claims.

What is claimed is:

1. A high pressure hose having an integral reinforcement and assembly comprising:
   a flexible polymeric tube;
   a reinforcement placed over the tube;
   a flexible polymeric cover formed over the tube and reinforcement, the tube, reinforcement and cover defining a hose having an end portion and an external diameter;
   a coupling attached to the end portion of the hose, the coupling including a stem portion inserted into the tube, and a ferrule portion positioned over the cover, the stem and ferrule portion sandwiching and gripping the end portion of the hose;
   a flexible sleeve of predetermined length telescoped over and shrouding a portion of the hose, the sleeve having an internal diameter that is greater than the external diameter of the hose and having an end portion located radially juxtaposed the stem and end portion of the hose; and
   means for attaching and sealing the end portion of the sleeve to the end portion of the hose.

2. A flexible hose as set forth in claim 1 wherein said sleeve has an internal diameter sufficiently greater than the external diameter of the hose such that the hose and sleeve define an annularly shaped escape volume.

3. A flexible hose as set forth in claim 1 wherein said sleeve includes a reinforcement disposed therein.

* * * * *